United States Patent [19]
Crane, Jr. et al.

[11] Patent Number: 5,951,665
[45] Date of Patent: Sep. 14, 1999

[54] INTERFACE OPTIMIZED COMPUTER SYSTEM ARCHITECTURE

[75] Inventors: Stanford W. Crane, Jr., Boca Raton; Lakshminarasimha Krishnapura, Delray Beach; Daniel Fuoco, Boca Raton, all of Fla.; Roy K. Lee, Fremont, Calif.; Kevin J. Link, Boca Raton, Fla.; Moises Behar, Boca Raton, Fla.; Arindum Dutta, Boca Raton, Fla.; William Cross, Los Gatos, Calif.

[73] Assignee: The Panda Project, Boca Raton, Fla.

[21] Appl. No.: 08/970,502

[22] Filed: Nov. 14, 1997

[51] Int. Cl.⁶ ..................................................... G06F 13/40
[52] U.S. Cl. .......................... 710/126; 710/126; 710/127; 710/128; 710/129
[58] Field of Search ................................. 395/306, 307, 395/287, 500, 800.32, 750.01

[56] References Cited

U.S. PATENT DOCUMENTS

| | | | |
|---|---|---|---|
| 5,301,281 | 4/1994 | Kennedy | 710/127 |
| 5,572,685 | 11/1996 | Fisher | 710/107 |
| 5,617,546 | 4/1997 | Shih | 710/127 |
| 5,625,802 | 4/1997 | Cho | 710/127 |
| 5,774,734 | 6/1998 | Kikinis | 713/300 |
| 5,781,408 | 7/1998 | Crane, Jr. | 709/303 |
| 5,796,942 | 8/1998 | Esbenser | 713/201 |
| 5,812,797 | 9/1998 | Crane, Jr. | 710/126 |
| 5,822,551 | 10/1998 | Crane, Jr. | 710/127 |

OTHER PUBLICATIONS

Digital Semiconductor Alpha PC 164 Motherboard Technical Reference Manual, Digital Equipment Corp., Jan. 17, 1997.
PCT International Search Report mailed Mar. 25, 1999, in International Application No. PCT/US98/24253.

*Primary Examiner*—Meng-Ai T. An
*Assistant Examiner*—Stacy Whitmore
*Attorney, Agent, or Firm*—Morgan, Lewis & Bockius LLP

[57] ABSTRACT

A computer system includes a bus system; a pluggable central processing unit circuit board, coupled to the bus system; a pluggable logic board coupled to the pluggable central processing unit circuit board through the bus system; a pluggable input/output board coupled to the pluggable logic board through the bus system; a first connector unit for directly connecting the pluggable central processing unit circuit board to a first predetermined location on the pluggable logic board; and a second connector unit for directly connecting the pluggable logic board to a predetermined location on the pluggable input/output board.

37 Claims, 17 Drawing Sheets

INTERFACE OPTIMIZED COMPUTER SYSTEM ARCHITECTURE

BACKGROUND OF THE INVENTION

1. Related Applications

This application is related to several other patent applications which are commonly owned by the Assignee of this application. Those related applications are: U.S. Design patent application, Ser. No. 29/081,929 entitled Computer Cabinet, U.S. patent application, Ser. No. 08/970,503 entitled Cooling System for Semiconductor Die Carrier, U.S. patent application, Ser. No. 08/970,379 entitled Multi-Chip Module, and U.S. patent application, Ser. No. 08/970,434 entitled Decorative Panel for Computer Enclosure, all of which are hereby incorporated by reference.

2. Field of the Invention

The present invention relates to a computer system, and more particularly, to a computer system architecture.

3. Description of the Related Art

Conventional computer systems contain electronic components that are located on printed circuit boards (PCBs). PCBs are also called "cards," "daughtercards," or "motherboards." Conventional computers contain the majority of their components on a main PCB called a "motherboard." The motherboard usually contains at least a processor, memory, and a peripheral controller. The motherboard usually also contains various bus logic chips, buffers, bus protocol circuitry, and memory management chips.

Some conventional systems include PCBs in addition to the motherboard. These additional PCBs typically plug into sockets in the motherboard (also known as expansion slots) and PCBs contain electronics used by the motherboard, where the electronics are of a type compatible with the motherboard. Such electronics may include controllers for add-on peripherals, video circuitry, sound circuitry, etc. Other conventional systems contain a memory subsystem in low-bandwidth pluggable modules (called single in-line memory modules or "SIMMs") on one or more separate PCBs.

The electronic elements on a motherboard are connected to one another on the motherboard by one or more "busses" and by lines carrying various control signals. Busses transmit addresses, data, control signals, etc. between electronic components. A motherboard is connected to other PCBs by one or more "connectors." Each connector has "pins," some of which transmit signals that are passed between the motherboard and the other PCBs and some of which are connected to power or ground. Signal paths called "traces" connect the connectors on the PCBs, backplanes, and/or motherboards.

Conventional connectors that are used to connect PCBs cannot achieve a density much higher than eighty contacts per linear inch. This low density limits the number of pins that can be located on a connector and limits the possible width of busses connecting the motherboard to other PCBs. In addition, when a connector contains a relatively small number of pins, signals are often multiplexed on at least some of the pins. When two signals are multiplexed on a single pin, for example, the signals are transmitted at different times over the single pin.

Multiplexed signals add electronic overhead and slow the operational speed of the system. As an alternative to narrow busses and multiplexed signals, some conventional systems simply use very large connectors. Such a size increase causes timing problems. Similarly, undesirable effects such as noise, signal disturbances, propagation delay, and crosstalk increase along with connector size. Some connector pins must be used for power and ground signals. It is desirable to have a relationship of 2:1 or 3:1 between signal and power/ground. Yet, such a relationship is not possible within the limitations of conventional low density connectors. Thus, the pin-out limits and size of conventional connector technology places limitations on the types of electronic components that can be located on boards other than the motherboard.

Generally, conventional computer systems include a processor on the motherboard. Some conventional systems allow a user to substitute processors by unplugging a first type of processor chip from the motherboard and replacing it with a second type of processor chip. Such substitution, however, can only be performed between processor chips having identical bus sizes and similar architectures. Specifically, both processor chips must be compatible with the other electronics on the motherboard.

The evolution of the personal computer has been marked by significant increases in processor speed. Bus widths have continued to increase for every new generation of processor. It is now common to integrate memory management and peripheral support functions into "chip sets." The introduction of a new processor or chip set has previously required that the computer's motherboard be redesigned to benefit fully from the increased functionality and bandwidth of the new processor. The high speeds and dense packages dictate that the processor, the chip set, and the bus that interconnects them be placed on a single motherboard. The use of a motherboard limits the extent to which an existing system can be upgraded when new technologies become available because a motherboard is designed to operate only with certain bus widths, memory management schemes, peripheral busses and expansion slots.

In general, therefore, it is desirable to make the components of a computer system as modular as possible. When most of the components of a computer system are located on a motherboard, the motherboard will necessarily be large. Manufacture of these large boards is more complex than manufacture of small boards and, therefore, large boards are more difficult and costly to manufacture. In general, the effects of the many small tolerances required by a large motherboard combine to cause manufacturing problems for large boards, resulting in a lower yield of usable boards during the manufacturing process. Large boards also must be thicker than small boards to avoid warpage and to facilitate routing of tracer.

In addition, the larger a board is, the more components are located on the board. Large boards are also more difficult and costly to repair than small boards because, for example, if a single component on a motherboard is faulty, the entire board must be removed from the computer for repair or replacement. As stated above, although it is desirable to have modular components in a computer system, the pin-out limits of conventional connectors make modularity impractical.

In a co-pending U.S. patent application Ser. No. 09/083,083 filed on May 22, 1998, entitled Passive Backplane Capable of Being Configured to a Variable Data Path Width Corresponding to a Data Size of the Pluggable CPU Board the Applicants have disclosed a passive backplane computer architecture which includes a pluggable central processing unit card including a microprocessor, a pluggable memory circuit card, a pluggable bridge circuit card, and a plurality of connectors or card slots in the passive backplane. The signal routing between these connectors on the backplane are designed to maximize the number of uncommitted or undefined signals between various card slots to allow flexibility in designing the cards. For example, of the 18 connectors disclosed in the preferred embodiment, signals from five of the connectors are predefined between various card slots whereas signals for the remaining thirteen connectors are not predefined to provide a flexible architecture.

Operation speed continues to be one of the main selling points for computers and other data processing equipment. Increases in operation speed lead to expanded capabilities in graphics, communications, and database applications, to name just a few. One way of increasing the operation speed of an electronic system is to reduce the board area by locating the components of the computer system closer together to reduce the wiring path or traces between the components. Propagation delay increases as the length of the traces between the components increases. Moreover, configurations with a high concentration of components within a small board area are difficult to cool. This is significant because the temperature at which a component, such as the microprocessor, is operated affects its operation speed. In general, a cool component may be reliably operated at higher speeds than a hot component. Modern high speed components have demanding cooling requirements, and future designs are likely to be even more demanding. Accordingly, the abilities to reduce the tracing paths between components and to cool the components are important factors in obtaining reliable, high speed operations of electronic systems.

As computers become smaller and as greater numbers of components are integrated within the casing of computers, the internal structure and layout becomes problematical. It is desirable to make computers having a small size. Yet, at the same time, as more components are added, servicing and upgrading become more difficult, while the cooling requirements of the computer may increase.

In conventional computers, the printed circuit boards that contain a CPU and its related electronics, as well as memories, and peripheral devices, such as hard disk drives and floppy disk drives, are housed in a single enclosure, devoid of internal partitions. All the elements that make up the computer reside in a single open area within the casing of the computer, containing only brackets necessary to support the components. There is generally no structure in these conventional arrangements to effectively separate the internal elements from one another to prevent heat and electromagnetic radiation generated by the components from considerably affecting the other elements within the enclosure.

Accordingly, there exists a need in the art to provide, among other things, an economical interface optimized computer architecture that is designed to allow for optimized trace distances between components, be compatible with high speed internal components, facilitate cooling and be designed so that its various components are easily accessible during upgrade and/or repair.

SUMMARY OF THE INVENTION

Accordingly, the present invention is directed to a computer system architecture that substantially obviates one or more of the problems due to limitations and disadvantages of the related art.

An object of the present invention is the provision of a new computer system architecture to make computer assembly more flexible and modular, thus allowing for facilitated access of individual components during upgrade and/or repair.

A further object of the present invention is to provide a new computer system architecture that effectively supports high speed internal components and applications.

A further object of the present invention is to provide a new computer system architecture that incorporates internal structure to provide optimized trace line distances between internal components to allow increased data transfer speed and reduce propagation delay.

A further object of the present invention is to provide a new computer system architecture that incorporates structure to optimize the cooling system of the internal components.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described herein, the invention includes a computer system including a bus system; a pluggable central processing unit circuit board, coupled to the bus system; a pluggable logic board coupled to the pluggable central processing unit circuit board through the bus system; a pluggable input/output board coupled to the pluggable logic board through the bus system; a first connector unit for directly connecting the pluggable central processing unit circuit board to a first predetermined location on the pluggable logic board; and a second connector unit for directly connecting the pluggable logic board to a predetermined location on the pluggable input/output board.

In another aspect of the instant invention, the computer system includes a bus system; a pluggable central processing unit circuit board, coupled to the bus system, including a processor; a cache memory portion; a cache memory controller; and a voltage regulator module; a pluggable logic board coupled to the pluggable central processing unit circuit board through the bus system, including a plurality of controller devices; a plurality of memory slots; a plurality of peripheral device ports for coupling peripheral devices to the pluggable logic board; ISA bridge circuitry; a pluggable input/output board coupled to the pluggable logic board through the bus system, including a plurality of PCI slots; a plurality of ISA slots; and PCI—PCI bridge circuitry; a first connector unit for directly connecting the pluggable central processing unit circuit board to a first predetermined location on the pluggable logic board; and a second connector unit for directly connecting the pluggable logic board to a predetermined location on the pluggable input/output board.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

In the drawings.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 1:
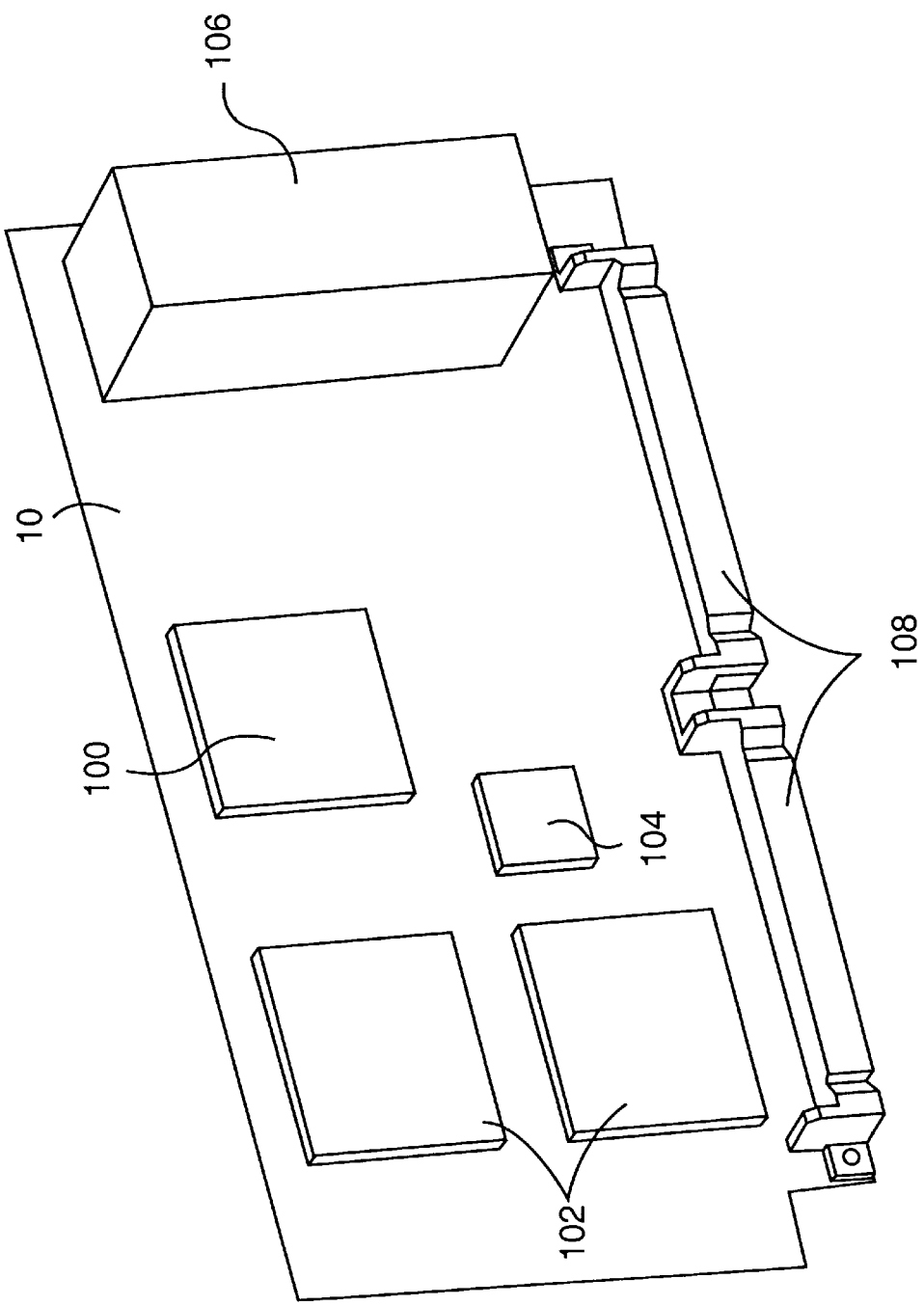
FIG. 1 is a diagram of an embodiment of the CPU board of the instant invention showing the location of its components on the board.

FIG. 1 illustrates an embodiment of the pluggable central processing unit circuit board (hereinafter CPU board) 10 of the present invention. The CPU board 10 includes a processor section 100, a cache memory portion 102 and cache memory controller 104. The cache memory controller 104 is preferably a TAG controller. The CPU board also includes a voltage regulator module 106 for ensuring a safe operating voltage level at the CPU board 10. Since the CPU board containing the processor is a pluggable subsystem, the present computer architecture can support a variety of different processors with a wide range of operation speeds. The processor preferably operates at 500 Mhz or higher speeds. In a preferred embodiment of the instant invention, the processor used is the DEC Alpha™ RISC processor. In another preferred embodiment of the instant invention, the RISC processor is in a prefabricated VSPA™ chip carrier, which allows increased processor speed by dissipating more heat from the processor die than in standard chip packages. This arrangement is further described in U.S. application Ser. No. 08/208,586, entitled "Prefabricated Semiconductor Chip Carrier," filed Mar. 11, 1994, and expressly incorporated by reference herein. As a result, increased processor speed is enabled, while minimizing any thermal problems along the lines of those discussed in the foregoing Background of the Invention.

The cache memory portion 102 is preferably an SRAM memory of any of a wide range of memory sizes. The SRAM preferably has 4 Megabytes or higher density. Moreover, the SRAM cache memory may also be provided in a prefabricated VSPA™ chip carrier to correspond to the increased processor speed attained by its VSPA™ packaging. More particularly, the cache memory portion in the pluggable central processing unit circuit board may be housed in at least one multi-chip module. This multi-chip module arrangement is described in detail in U.S. patent application, Ser. No. 08/970,379 entitled Multi-Chip Module, filed concurrently herewith, and incorporated by reference earlier in this application.

Figure 14:
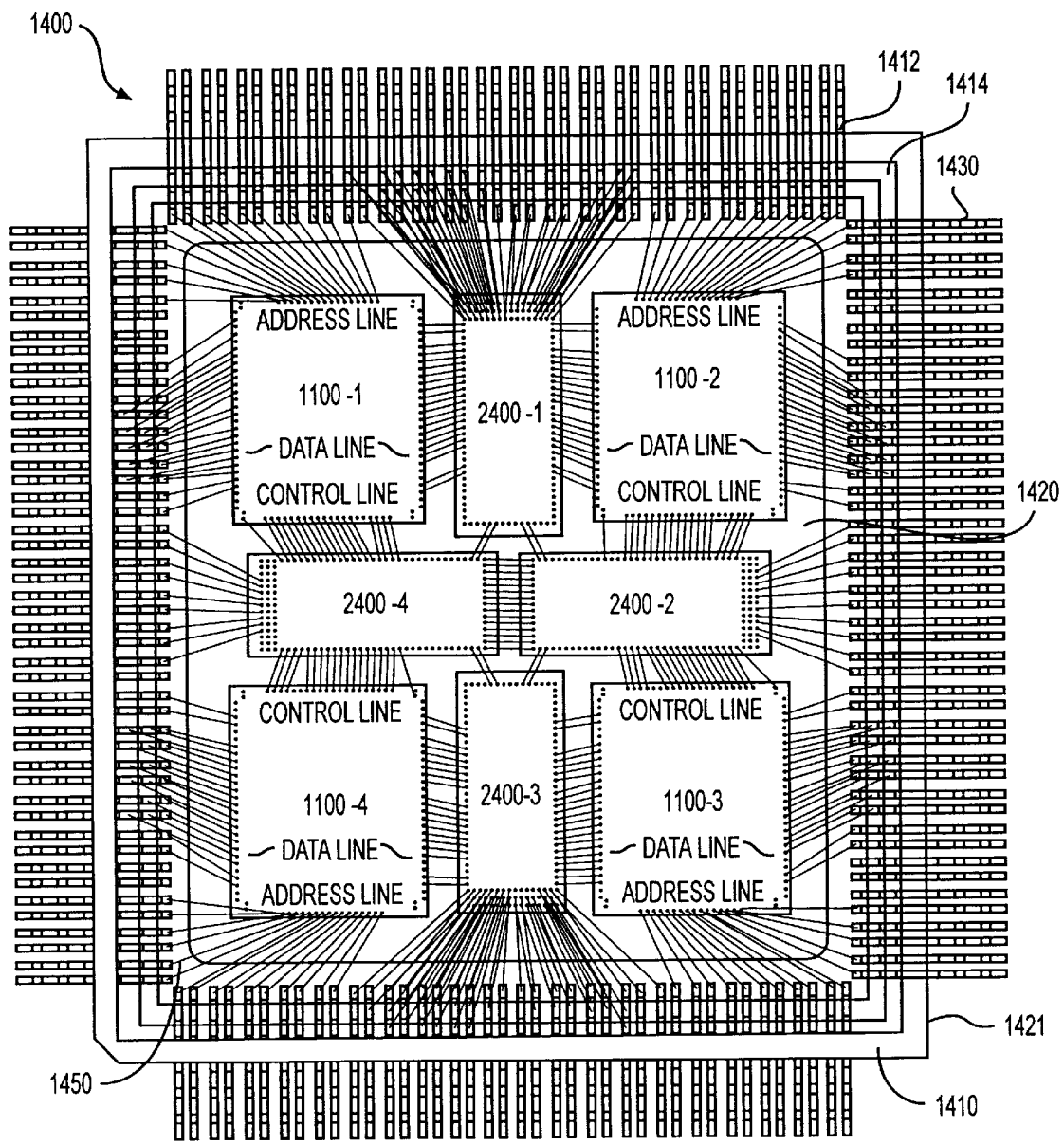
FIG. 14 illustrates an embodiment of a multi-chip module (CM) in accordance with the present invention.

FIG. 14 illustrates an embodiment of a multi-chip module 1400 according to the present invention. The multi-chip module 1400 includes multiple IC dies 1100, a housing 1421, leads 1430, one or more interconnect dies 2400, and electrically conductive material 1450 for electrically connecting (wire bonding) IC dies 1100, leads 1430, and interconnect dies 2400. The multi-chip module may embody a cavity-down or flip-chip configuration in which, if the multi-chip module 1400 were mounted to a printed circuit board, the dies 1100 and 2400 would face the printed circuit board. Of course, the multi-chip module may be embodied in a cavity-up configuration as well.

Each multi-chip module includes a housing including a plurality of insulative side walls and an end plate, the end plate is joined to the side walls to define a cavity. A plurality of electrically conductive leads are held in the side walls. Each of the conductive leads includes an internal lead section extending within the cavity and an external lead section extending outside of the housing. A plurality of integrated circuit memory dies are mounted to the end plate within the cavity. A plurality of interconnect dies are mounted to the end plate within the cavity. Each interconnect die is positioned adjacent to at least two of the plurality of integrated circuit dies. An electrically conductive material electrically connects the electrically conductive leads, the integrated circuit dies, and the interconnect dies.

By way of example, FIG. 14 shows four IC dies 1100-1, 1100-2, 1100-3, and 1100-4. Of course, the multi-chip module 1400 may include any plural number of IC dies 1100. The IC dies 1100 may be any active integrated circuit component. For example, the IC dies 1100 may include one or more memories such as static random access memory (SRAM) or dynamic random access memory (DRAM), among others. In one preferred embodiment, IC dies 1100 comprise four SRAM dies to be mounted on the pluggable CPU board of the instant invention to form a cache memory.

The modular, pluggable CPU board 10 of the instant invention allows placement of its respective components in close proximity to each other, resulting in optimized trace distances between them. Particularly, the processor unit 100 and the cache memory 102 are in close proximity, resulting in a short trace distance between them and optimizing or minimizing the propagation delay for a fast data transfer between them. The modularity of the CPU board allows such close proximity among the various components of the system since it only contains a limited number of components as opposed to the motherboard arrangement of conventional configurations, which include elements for CPU functionality as well as I/O, bridge and memory related elements. Because this modular CPU board has fewer elements than the conventional motherboard, the problems relating to heat generation surrounding the processor, for example, as a result of a high concentration of many elements do not surface. Moreover, as will be described, the interface optimized computer architecture arrangement of the instant invention also allows an improved cooling functionality over prior arrangements which further allows for such close proximity placement of internal elements.

Figure 2:
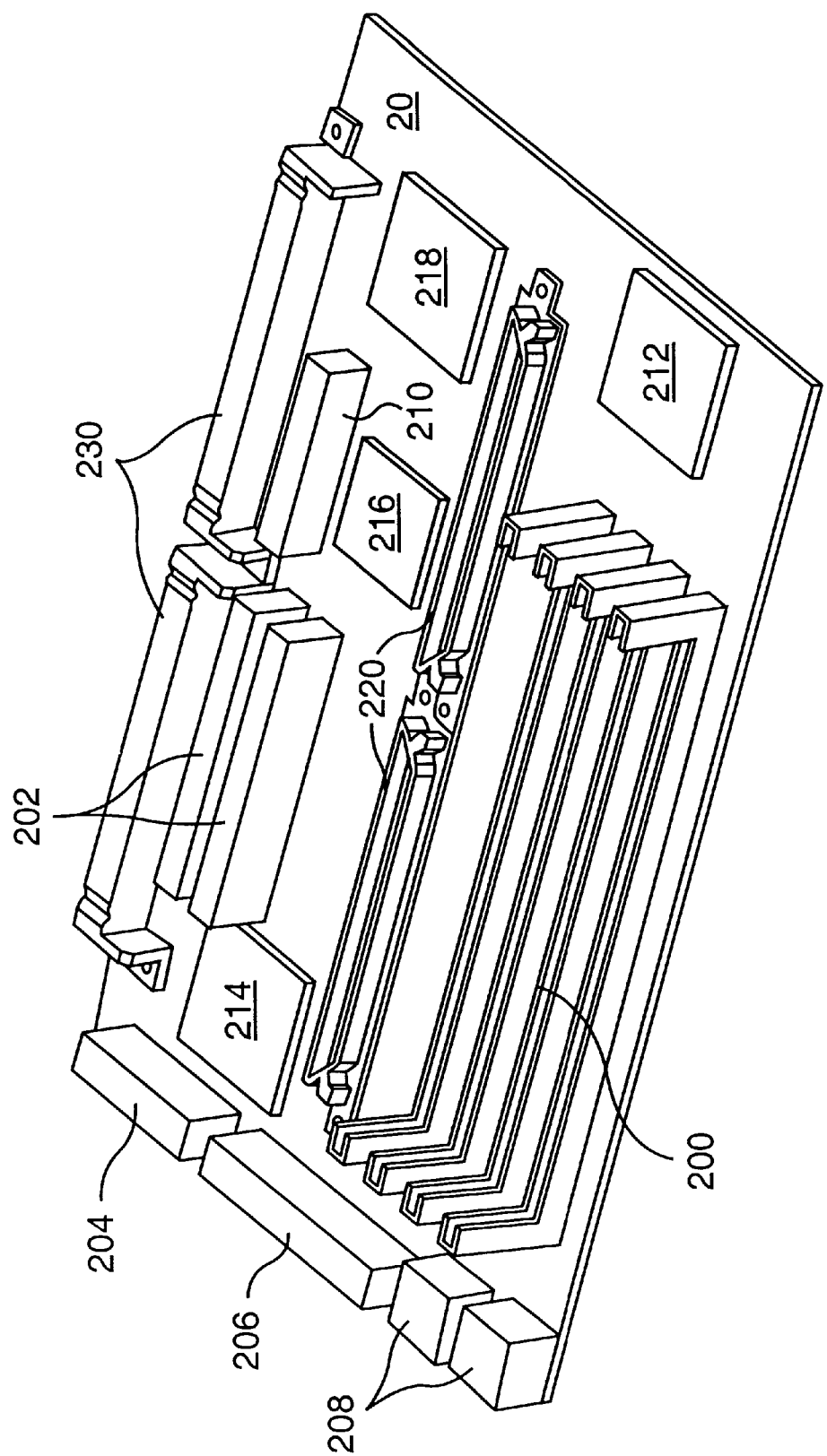
FIG. 2 is a diagram of an embodiment of the logic board of the instant invention showing the location of its components on the board.

The CPU board 10 also includes connector mating portion 108 situated along the CPU board's lower edge as shown in FIG. 1. This connector mating portion 108 is half of the first connector unit which also includes connector mating portion 220, as shown in FIG. 2. This first connector unit, including mating parts 108 and 220, directly connects the pluggable central processing circuit board 10 to a first predetermined location on the pluggable logic board 20 of FIG. 2. This connection can be seen in FIGS. 4 and 5, which show the interconnection of the CPU board 10, the logic board 20, and the input/output (I/O) board 30.

The connecting portion is preferably a high density connector as described in U.S. patent application Ser. No. 08/208,877, filed on Mar. 11, 1994, entitled "Modular Architecture For High Bandwidth Computers," and U.S. patent application Ser. No. 08/911,010, filed on Aug. 14, 1997, entitled "Electrical Connector Assembly," which are incorporated by reference herein. FIGS. 22–38 of the Ser. No. 08/208,877 application show the high-density connector (or connector system) used to connect PCB's and backplanes of that invention. The same connectors can also be used to directly connect two PCB's together as described in the instant invention. This high density connector includes at least 100 contacts per linear inch, as defined in the Ser. No. 08/208,877 and Ser. No. 08/911,010 applications, which have been incorporated by reference.

Figure 15:
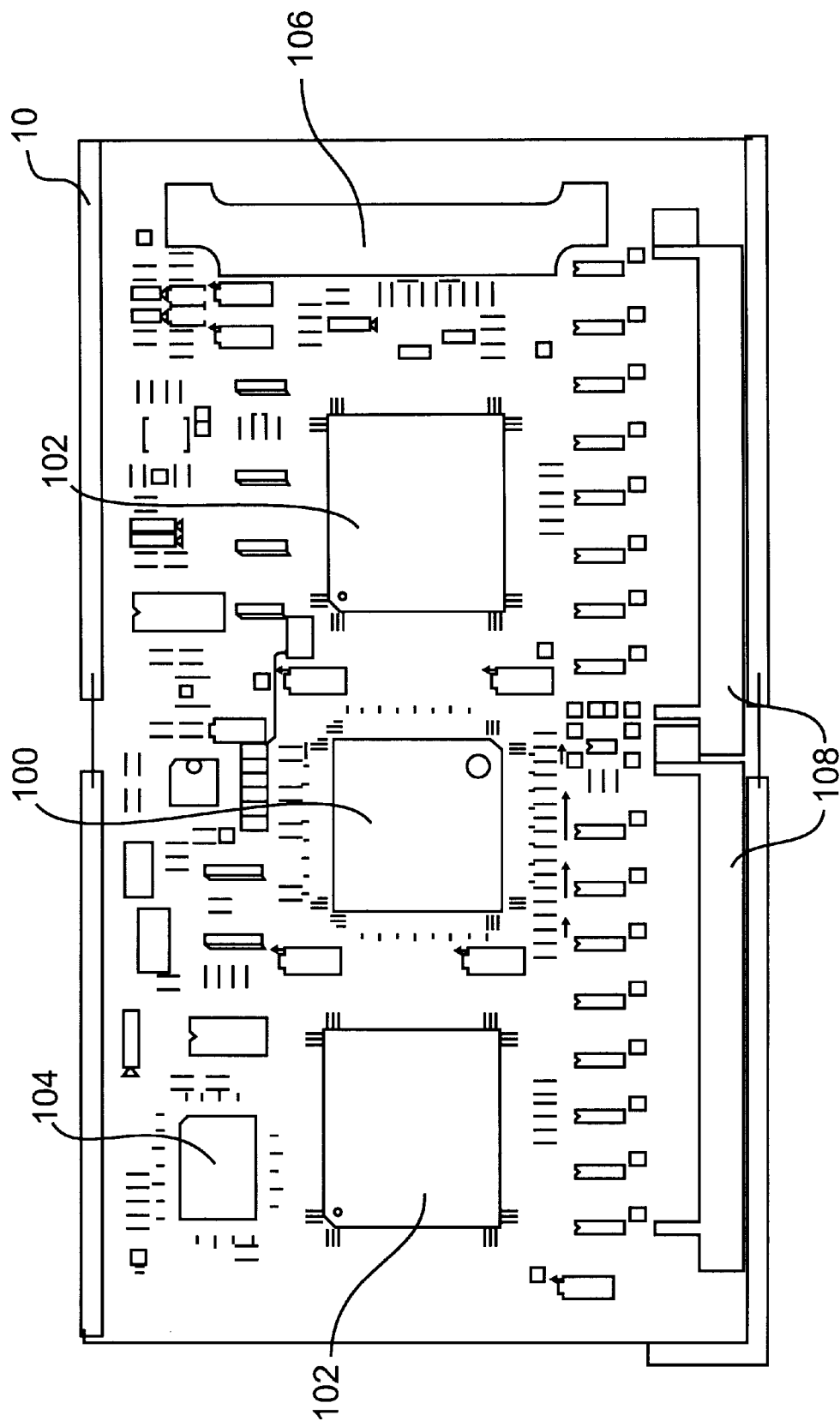
FIG. 15 is a diagram of another embodiment of the CPU board of the instant invention showing the location of its components on the board.

The particular arrangement of components on the pluggable central processing unit circuit board is not limited to the embodiment shown in FIG. 1. Other embodiments may be employed consistent with the spirit and scope of the present invention. For example, FIG. 15 illustrates another embodiment of the pluggable central processing unit circuit board 10 of the instant invention with like components similarly labeled. Other components shown in FIG. 15 include various capacitors, resistors, and drive circuitry.

FIG. 2 illustrates an embodiment of the pluggable logic board 20 of the instant invention. The logic board 20 includes a system (super) I/O controller (SIO) 214, an integrated device electronics controller (IDE) 216, and an ISA bridge circuitry 218. The logic board 20 also has memory functionality which preferably includes a number of memory slots 200 for industry standard 168 pin DIMMs, for example. A PYXIS chip set 212 is situated in close proximity to the memory slots 200 on the logic board 20. The PYXIS chip set 212 incorporates both memory controller and host PCI controller functionality. The logic board 20 also has a plurality of peripheral device ports for coupling peripheral devices to the board. These include serial port 204, parallel port 206, mouse and keyboard ports 208, floppy disk drive interface 210, and integrated device electronics disk drive interfaces 202.

Figure 3:
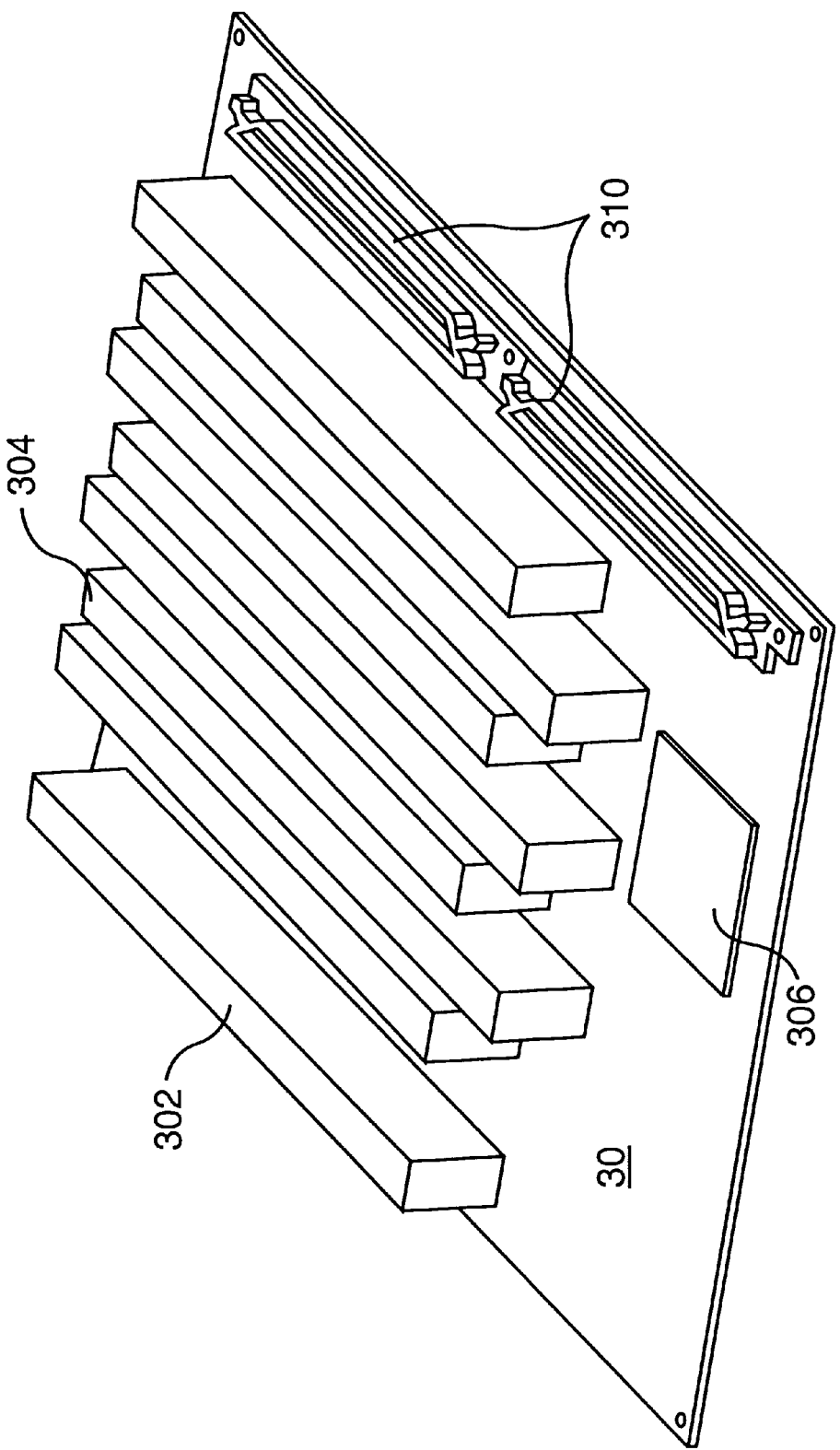
FIG. 3 is a diagram of an embodiment of the input/output (I/O) board of the instant invention showing the location of its components on the board.

The logic board 20 also includes connector mating portion 230 situated along the logic board's lower edge as shown in FIG. 2. This connector mating portion 230 is half of the second connector unit which also includes connector mating portion 310, as shown in FIG. 3. This second connector unit, including mating parts 230 and 310, directly connects the pluggable logic board 20 to a predetermined location on the pluggable input/output board 30 of FIG. 3. This connection can be seen in FIGS. 4 and 5, which show the interconnection of the CPU board 10, the logic board 20, and the input/output board 30. This second connector unit is preferably the high density connector referred to above in regard to the first connector unit, and thus also comprises at least 100 contacts per linear inch, as defined in the Ser. No. 08/208,877 and Ser. No. 040879/5074 applications which have been incorporated by reference.

Thus, the pluggable logic board 20 has mating half 220 of the first connector unit and mating half 230 of the second connector unit mounted on it. Mating half 220 is preferably situated, as shown in FIG. 2, at a central area of the pluggable logic board 20 substantially parallel to the plurality of memory slots 200. Mating half 230 is preferably situated, as shown in FIG. 2, along an edge of the pluggable logic board 20 substantially parallel to the plurality of memory slots 200 and the mating half 220. Elements 214, 202, 216, 210 and 218, already discussed above, are preferably situated on the logic board 20 between the mating halves 220 and 230, as shown in FIG. 2.

Figure 16:
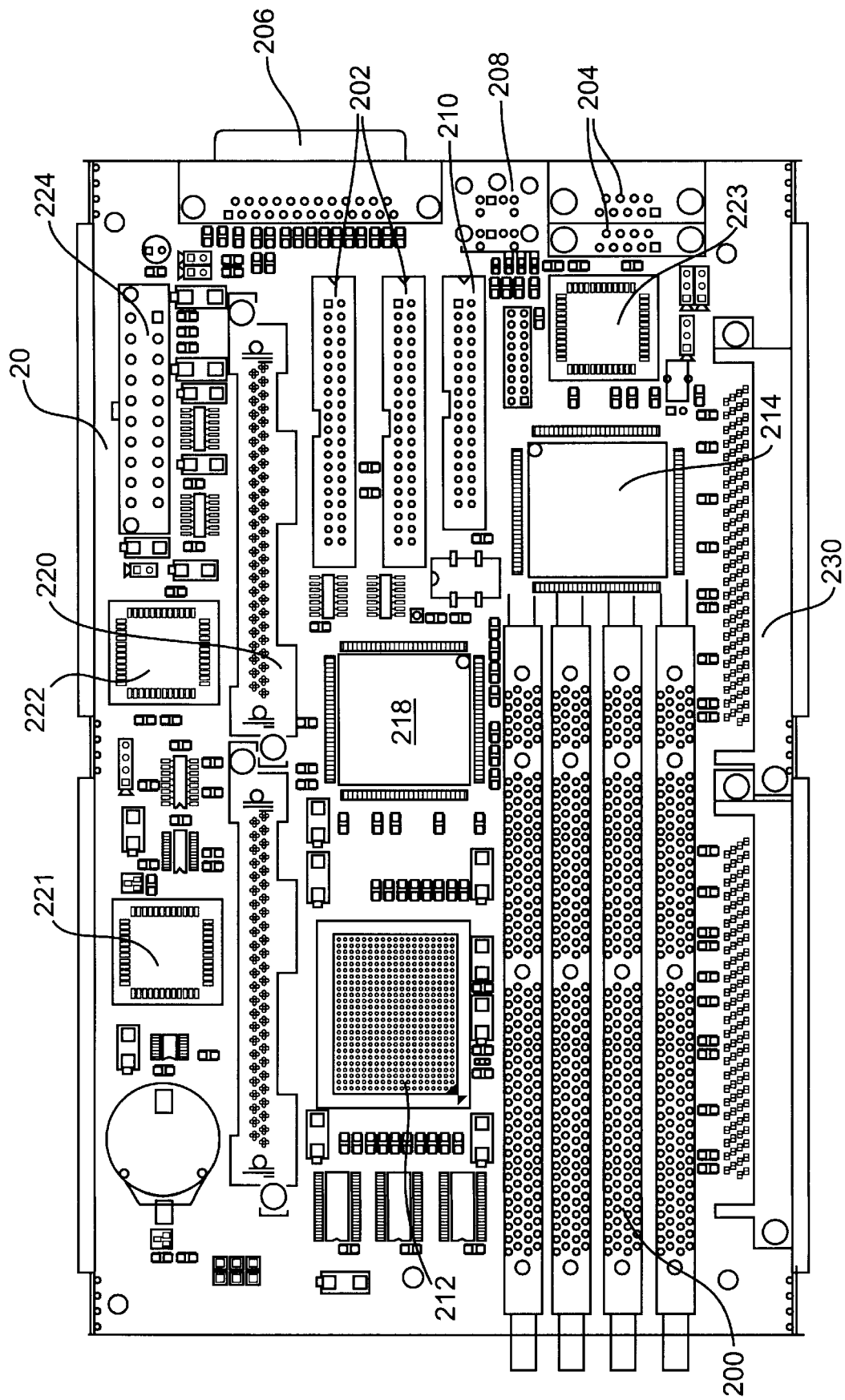
FIG. 16 is a diagram of another embodiment of the logic board of the instant invention showing the location of its components on the board.

The particular arrangement of components on the pluggable logic board is not limited to the embodiment shown in FIG. 2. Other embodiments may be employed consistent with the spirit and scope of the present invention. For example, FIG. 16 illustrates another embodiment of the pluggable logic board of the instant invention with like components similarly labeled. Also shown in FIG. 16 is a logic chip 221, an arbitration PAL programmable logic device chip 222, a programmable logic device interrupt multiplex chip 223, and a power supply port 224. These particular components 221, 222, 223, and 224 are located on the rear side of the pluggable logic board 20 in the embodiment shown in FIG. 2. Other components shown in FIG. 16 include capacitors, resistors, and drive circuitry. For further explanations on the functionality of the components of the logic board, see Digital Semiconductor AlphaPC 164 Motherboard Technical Reference Manual (1997), which is hereby incorporated by reference.

FIG. 3 illustrates an embodiment of the pluggable input/output board 30 of the instant invention. The input/output board 30 includes a plurality of PCI slots 302, ISA slots 304, PCI—PCI bridge circuitry 306, as well as mating half 310 of the second connector unit. The PCI slots 302, ISA slots 304 and mating half 310 are preferably situated substantially parallel to each other on the input/output board 30.

Figure 17:
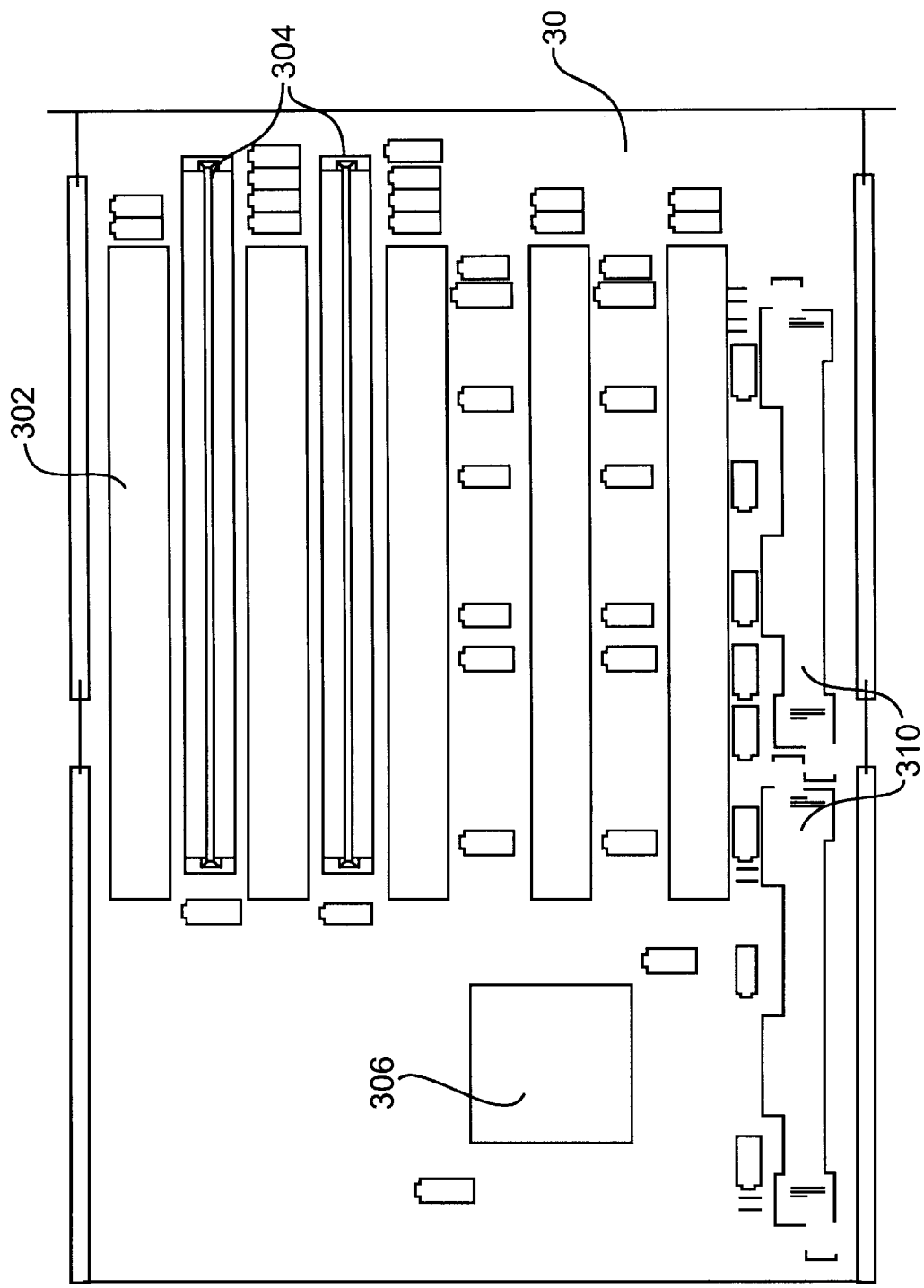
FIG. 17 is a diagram of another embodiment of the input/output board of the instant invention showing the location of its components on the board.

The particular arrangement of components on the pluggable input/output board is not limited to the embodiment shown in FIG. 3. Other embodiments may be employed consistent with the spirit and scope of the present invention. For example, FIG. 17 illustrates another embodiment of the pluggable input/output board of the instant invention with like components similarly labeled. Other components shown in FIG. 17 include capacitors, resistors, and drive circuitry. For further explanations on the functionality of the components of the input/output board, see Digital Semiconductor AlphaPC 164 Motherboard Technical Reference Manual (1997), which has been incorporated by reference.

Figure 4:
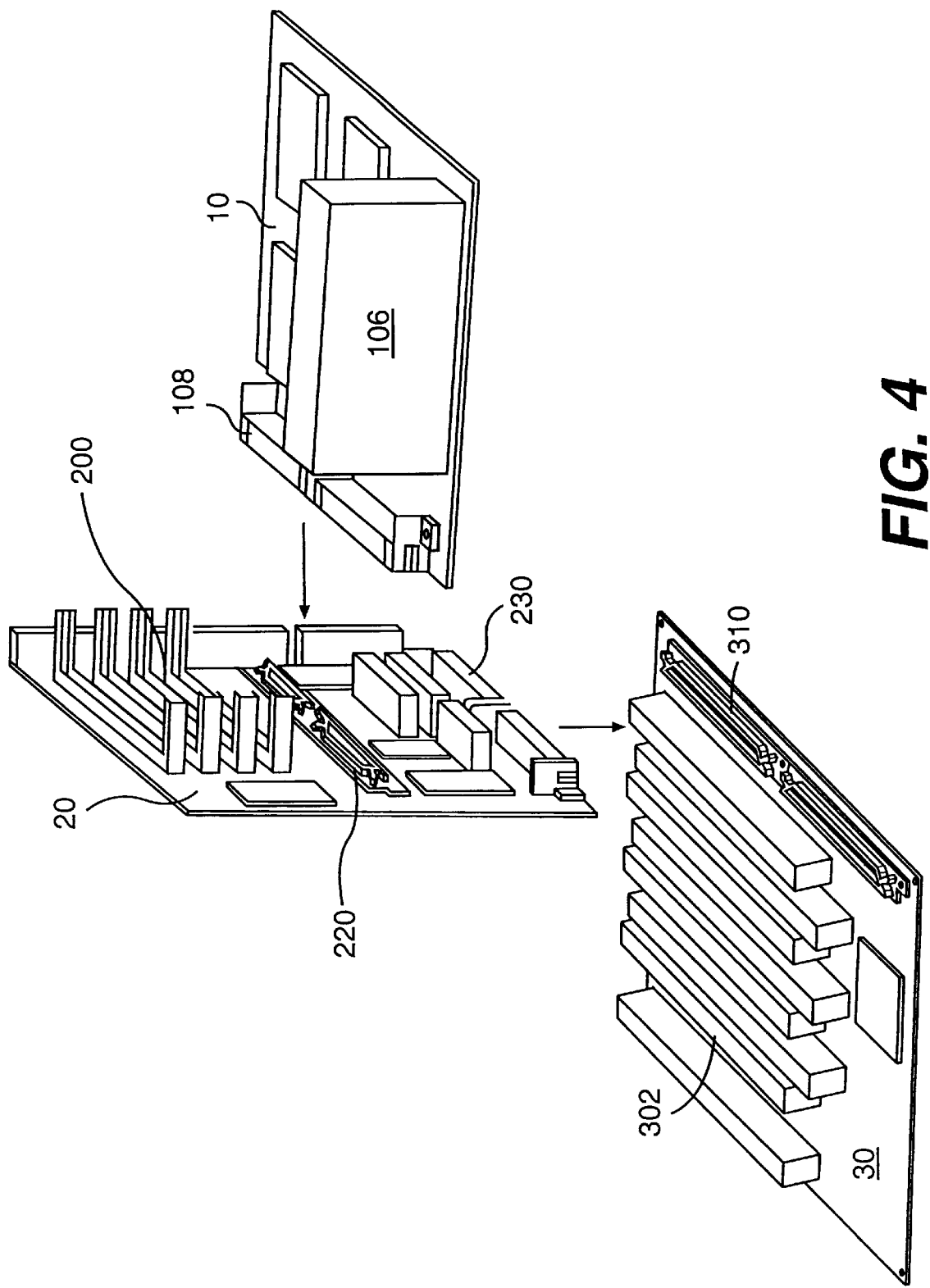
FIG. 4 is an exploded assembly view showing an interconnection of the CPU board, the logic board, and the input/output board of the instant invention.

FIG. 4 illustrates an exploded assembly view of the pluggable central processing unit circuit board 10, the pluggable logic board 20, and the pluggable input/output board 30. The arrows indicate the direct connection locations between the respective boards.

Figure 5:
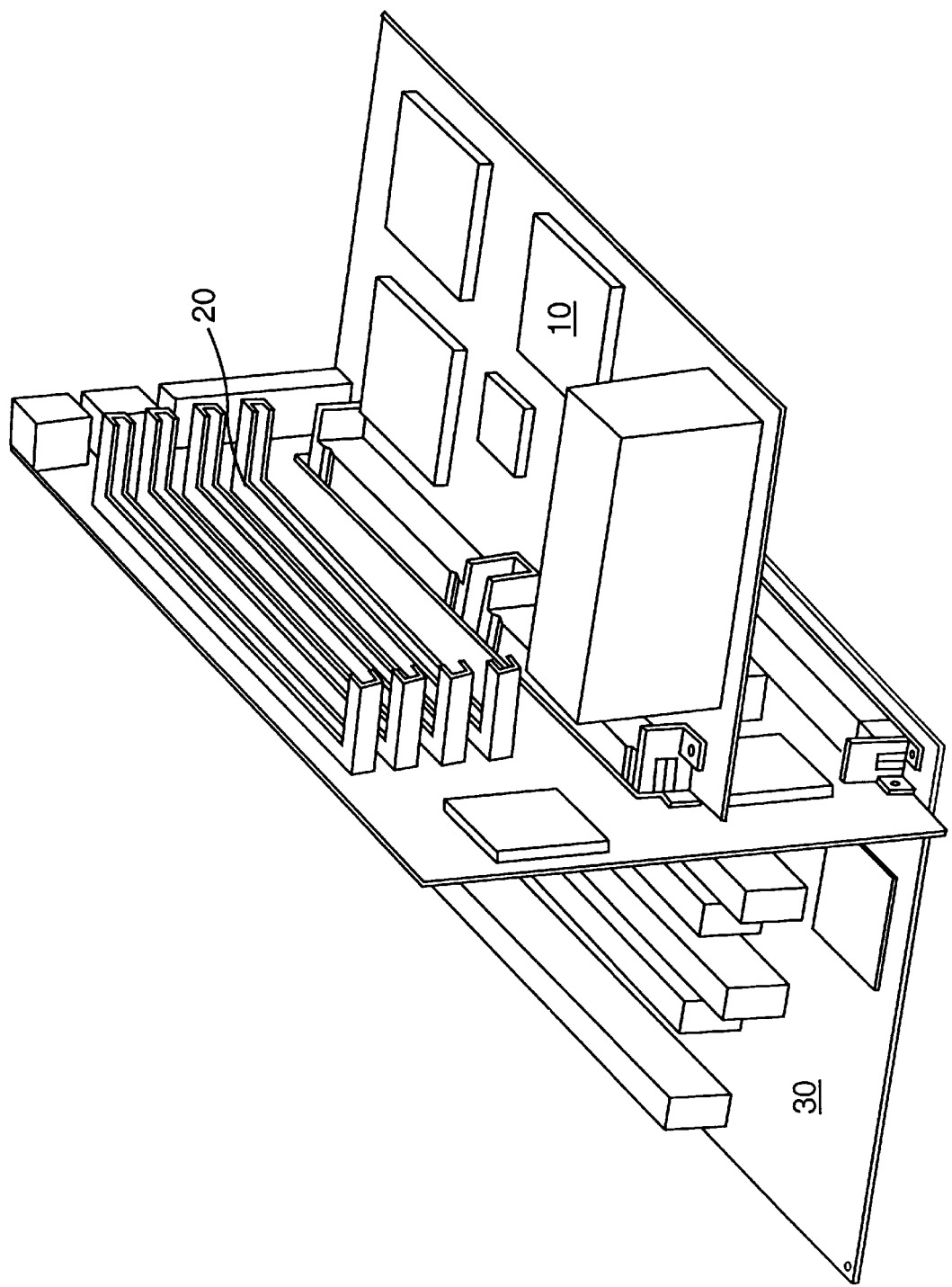
FIG. 5 is an assembly view showing the connection of the CPU board, the logic board, and the input/output board of the instant invention.

FIG. 5 illustrates the pluggable central processing unit circuit board 10, the pluggable logic board 20, and the pluggable input/output board 30 connected together. As indicated in FIG. 5, the three boards or cards are connected directly together, thus obviating the need for a separate motherboard or passive backplane. As a result, production costs are minimized by reducing the necessary materials to construct the computer architecture. Moreover, this arrangement results in reduced trace distances between the circuitry on the respective cards, resulting in an increased data transfer speed and rate and reduced propagation delay between the elements. This is especially advantageous as to the optimized trace distance between the microprocessor 100 and the cache memory 102, as well as the microprocessor 100 and the main memory 200. This arrangement also results in a much more efficient interior, shorter cable runs between elements, and less internal noise generated as a result of the shorter cable runs. Another significant advantage of this particular arrangement involves an increased efficiency in the cooling of the internal elements, which will be described with reference to FIGS. 6–13.

Figure 6:
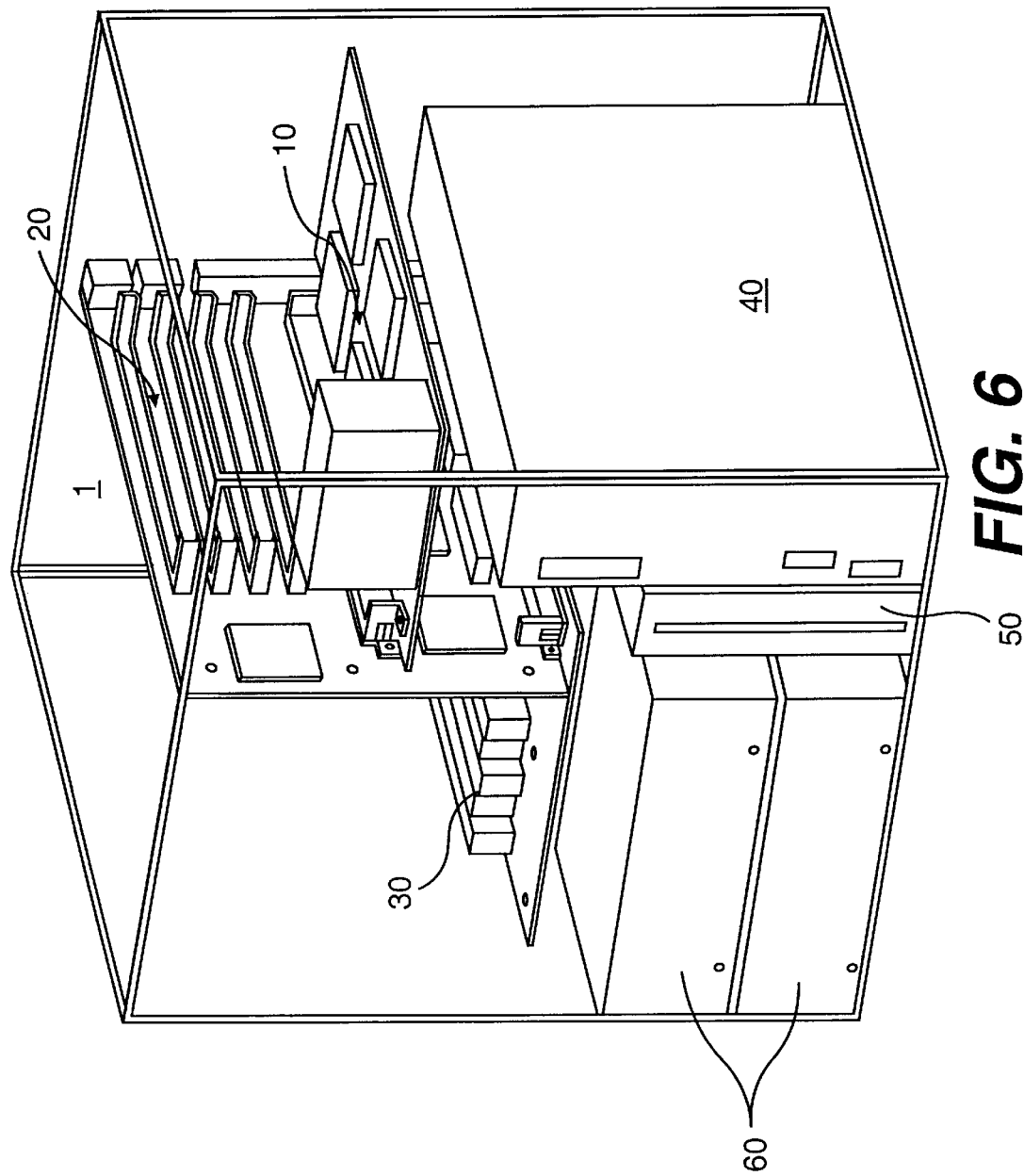
FIG. 6 is a perspective view of a cube of the instant invention housing the architecture of the computer system.

FIG. 6 illustrates the board arrangement of FIG. 5 placed within a housing 1. The housing also includes hard drives 60, situated below the pluggable input/output board 30. Next to the hard drives is a floppy disk drive 50 and an additional disk drive 40. The disk drives 50 and 40 are preferably located below the pluggable central processing unit circuit board 10. The additional disk drive 40, preferably being either a CD rom drive or a digital video disk (DVD) drive. The housing 1 is a substantially cubed shape. Preferably, the housing is a 10"×10"×10" cube.

Figure 7:
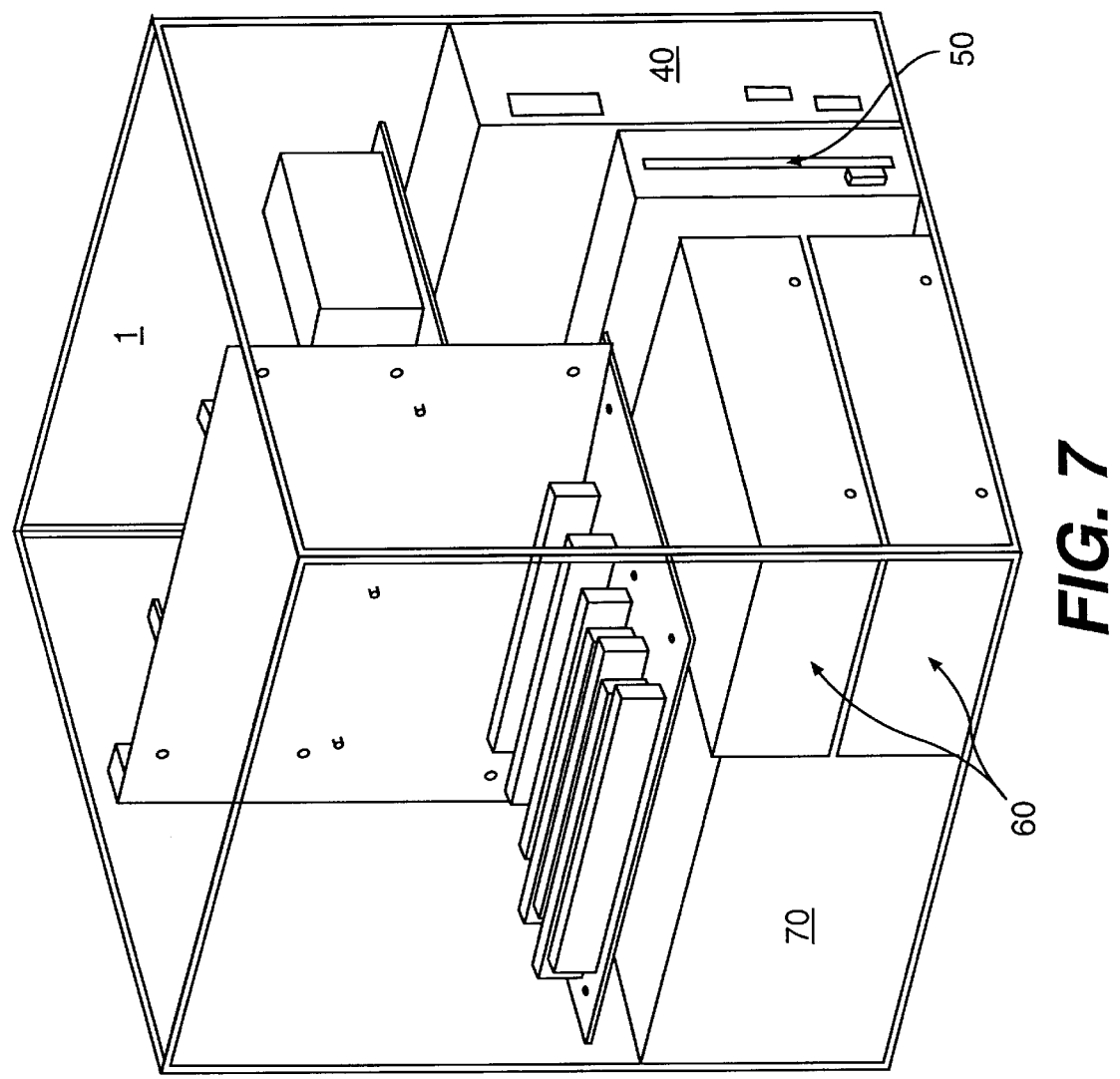
FIG. 7 is another view of the cube of the instant invention housing the architecture of the computer system shown in FIG. 6.

FIG. 7 illustrates another view of the components within the housing 1. This view further shows a power supply 70 preferably placed under the pluggable input/output board 30 and behind the hard drives 60. This power supply 70 is preferably at least 250 watts.

Figure 8:
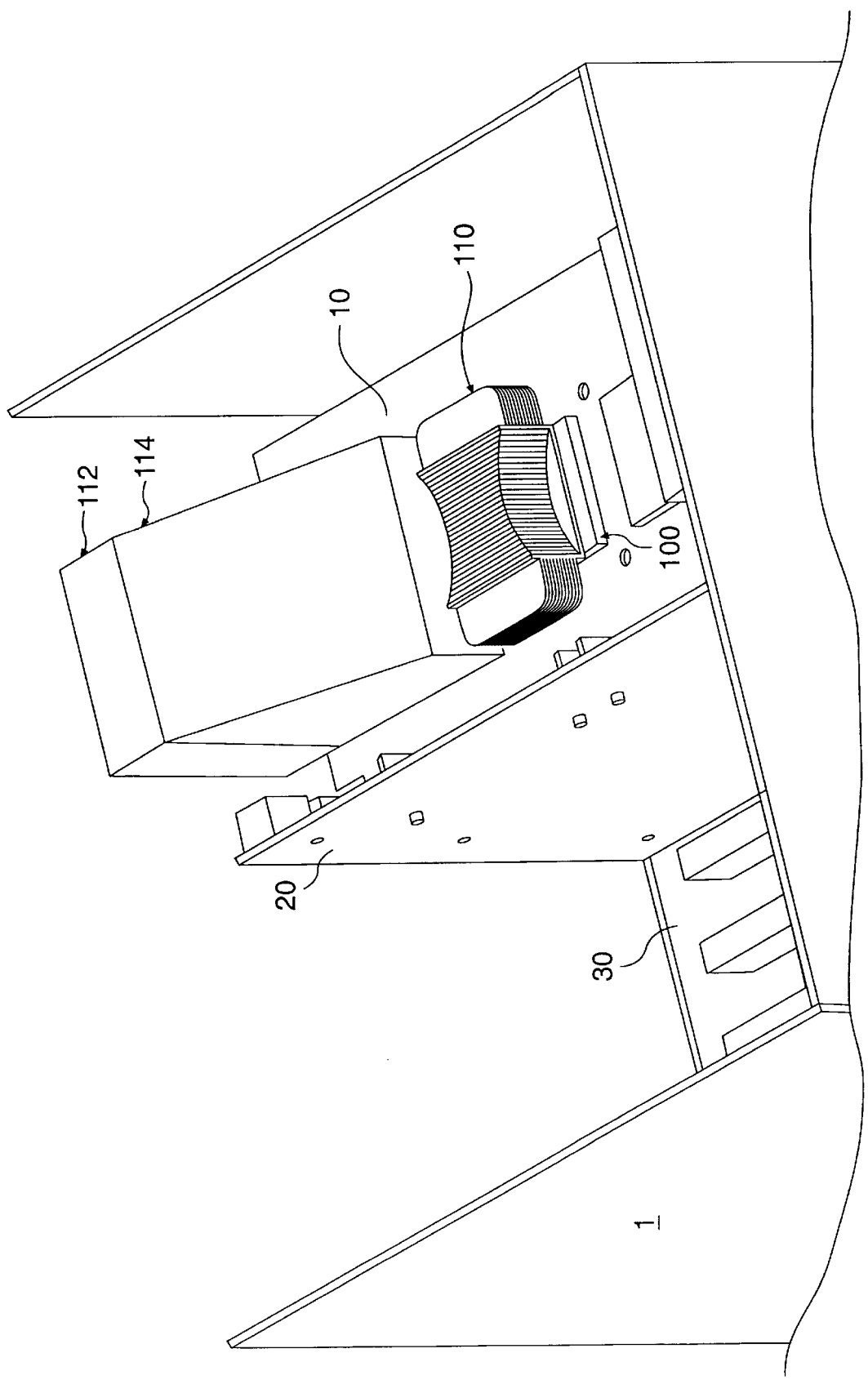
FIG. 8 is a top view of the cube of the instant invention showing an embodiment of the computer architecture including a fan, a duct, and a heat sink over the CPU card.

FIG. 8 illustrates an embodiment of the present invention where a fan 112 and attached duct 114 are provided over the pluggable central processing unit circuit board 10. Further, a heat sink 110 is provided over the processor 100. This fan and duct arrangement is described in detail in U.S. patent application, Ser. No. 08/970,563 entitled Cooling System for Semiconductor Die Carrier, filed concurrently herewith, which has been incorporated by reference. The heat sink 110 is further described in U.S. application Ser. No. 08/208,586, entitled "Prefabricated Semiconductor Chip Carrier", filed Mar. 11, 1994, and already incorporated by reference by the foregoing disclosure relating to the VSPA packaging embodiment of the processor 100.

FIGS. 9–13 are perspective views of the outside of the housing 1 showing six individual panels 1000–6000, one being on each of the 6 respective sides of the cube. Each panel has any combination of air vents, surface graphic designs, cut through areas for exposing internal components, or intake areas for power cords and the like.

Figure 9:
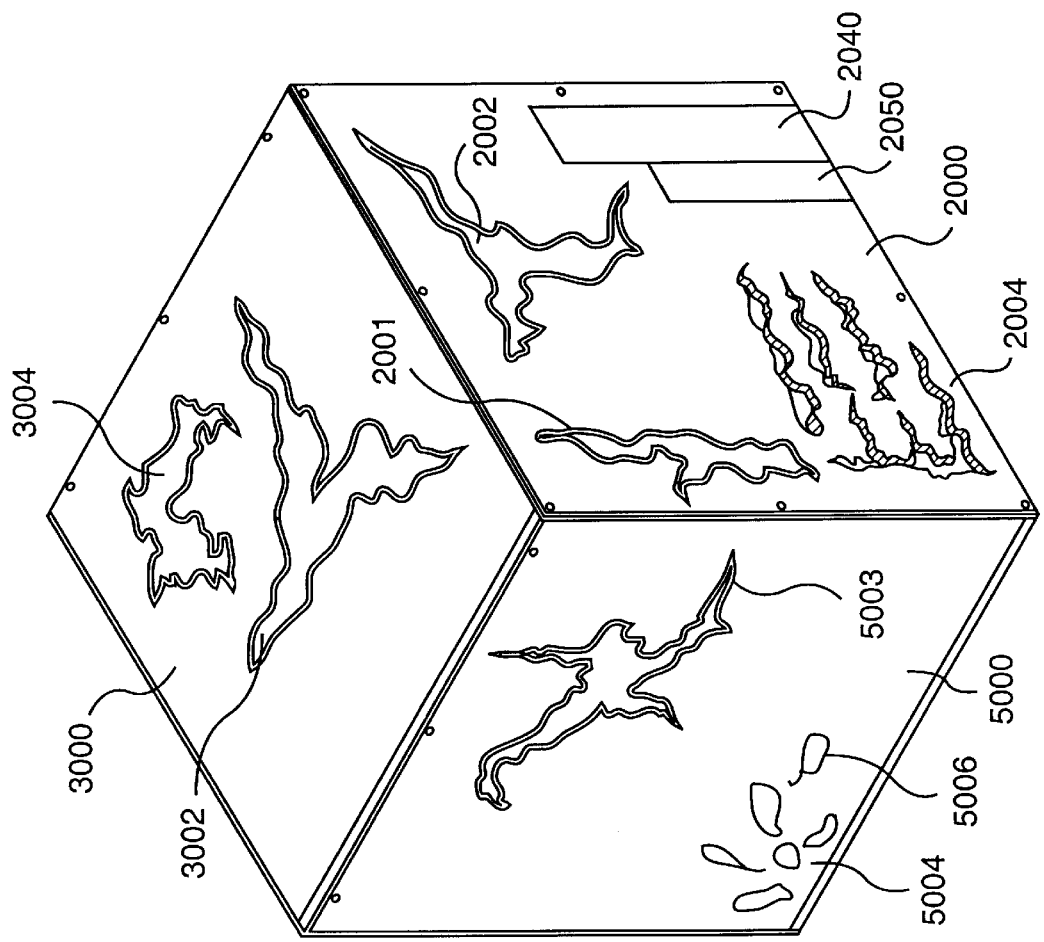
FIG. 9 is a perspective view showing panels of the cubular housing of the computer system of the instant invention.

FIG. 9 is a perspective view of the housing 1 and illustrates panels 2000, 3000 and 5000 of the cubular housing of the computer system of the instant invention. Panel 2000 preferably includes air vents 2004 which allow air intake for ventilation of the hard drives 60, which are located within the housing 1, in close proximity to the air vents 2004. Panel 2000 also includes cut-through areas 2040 and 2050, for respectively exposing the disk drives 40 and 50. Panel 2000 further includes surface graphic designs 2001 and 2002 to provide aesthetic qualities to the outside of the housing 1. Panel 3000 includes surface graphic designs 3002 and 3004 to provide, for example, aesthetic qualities to the outside of the housing 1. Panel 5000 includes air vents 5004 which allow air intake for ventilation of the power supply 70, which is located within the housing 1, in close proximity to the air vents 5004. Panel 5000 also includes intake area 5006, for passing through the power supply cord. Panel 5000 further includes surface graphic design 5002 to provide aesthetic qualities to the outside of the housing 1.

Figure 10:
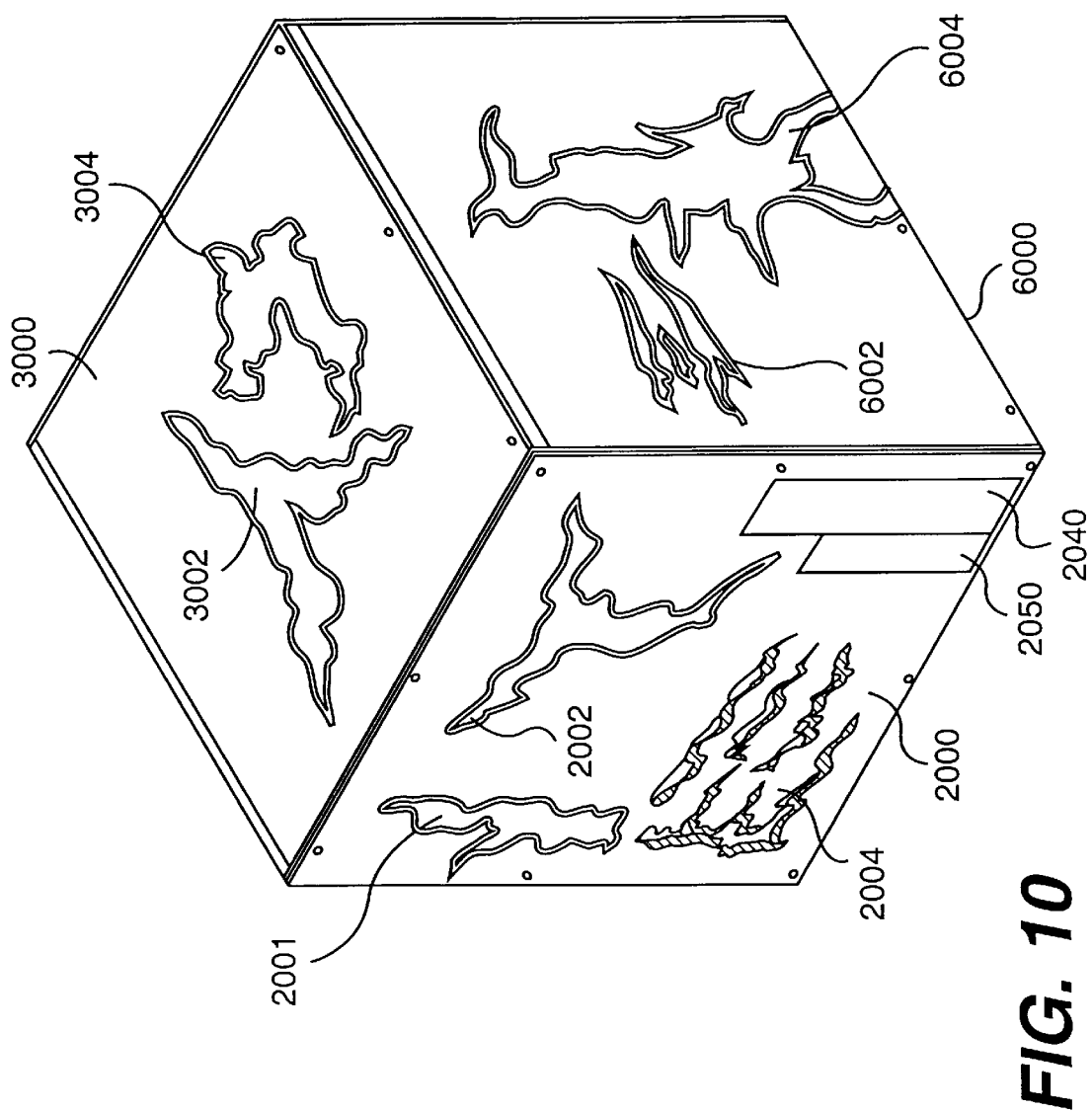
FIG. 10 is a perspective view showing panels of the cubular housing of the computer system of the instant invention.

FIG. 10 is a perspective view illustrating panels 2000, 3000 and 6000 of the cubular housing of the computer system of the instant invention. Panel 6000 includes surface graphic designs 6002 and 6004 to provide aesthetic qualities to the outside of the housing 1.

Figure 11:
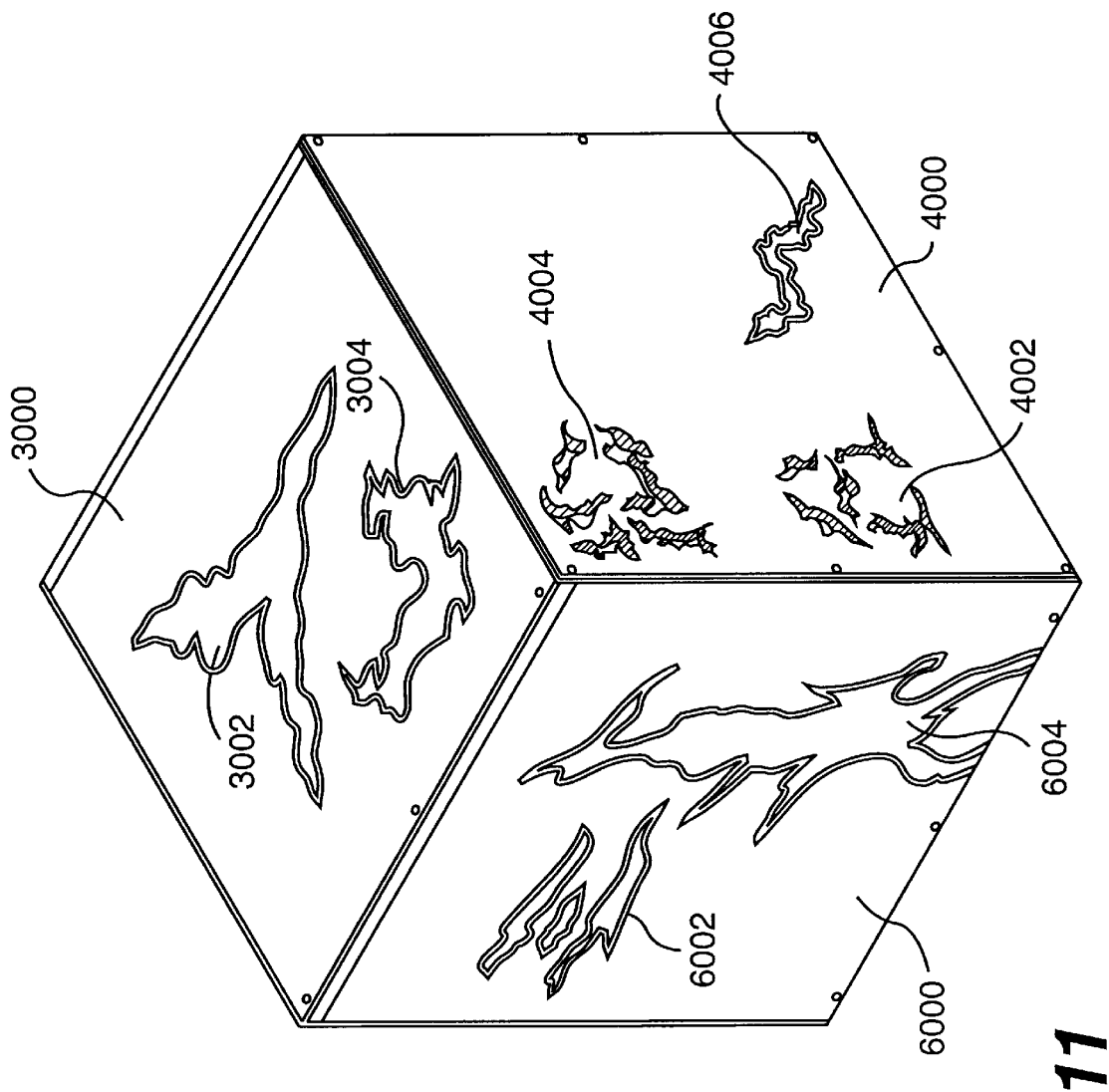
FIG. 11 is a perspective view showing panels of the cubular housing of the computer system of the instant invention.

FIG. 11 is a perspective view illustrating panels 3000, 4000 and 6000 of the cubular housing of the computer system of the instant invention. Panel 4000 includes air vents 4002 and 4004, which allow air intake for ventilation of the processor 100 and the main memory 200, which are located within the housing 1, in close proximity to the air vents 4002 and 4004. Panel 4000 further includes surface graphic design 4006 to provide aesthetic qualities to the outside of the housing 1.

Figure 12:
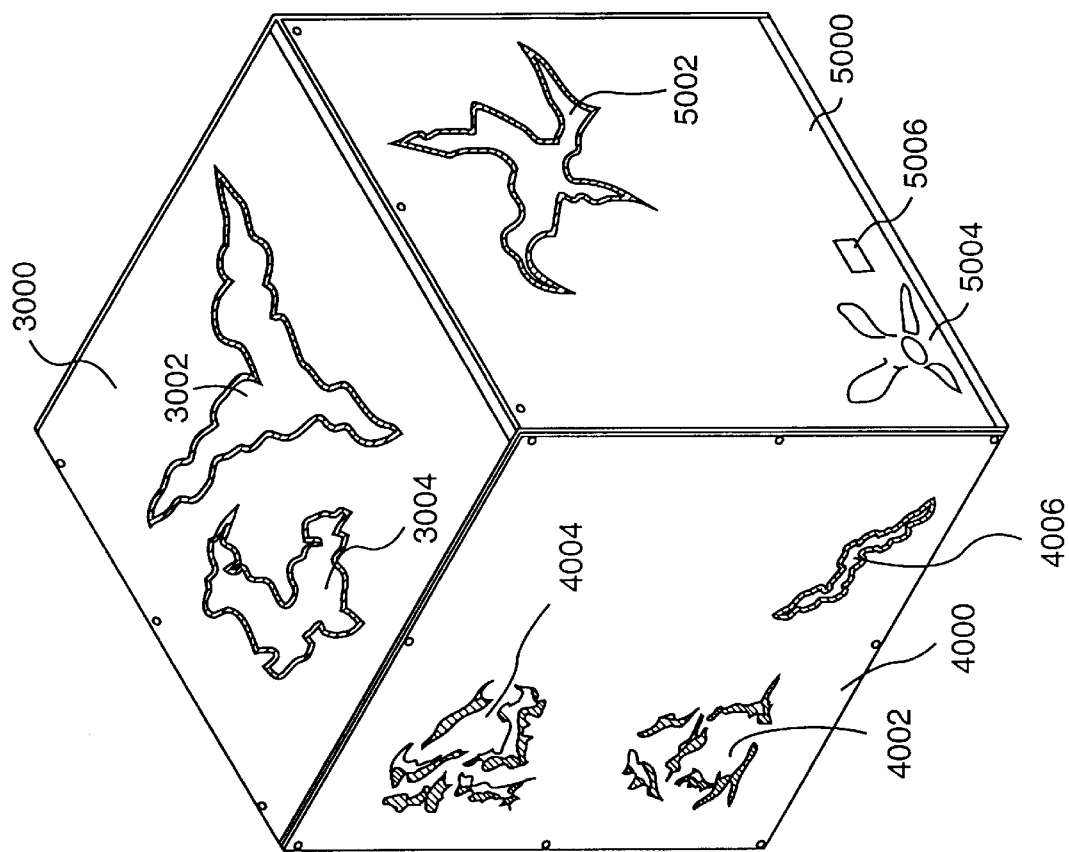
FIG. 12 is a perspective view showing panels of the cubular housing of the computer system of the instant invention.

FIG. 12 is a perspective view illustrating panels 3000, 4000 and 5000 of the cubular housing of the computer system of the instant invention.

Figure 13:
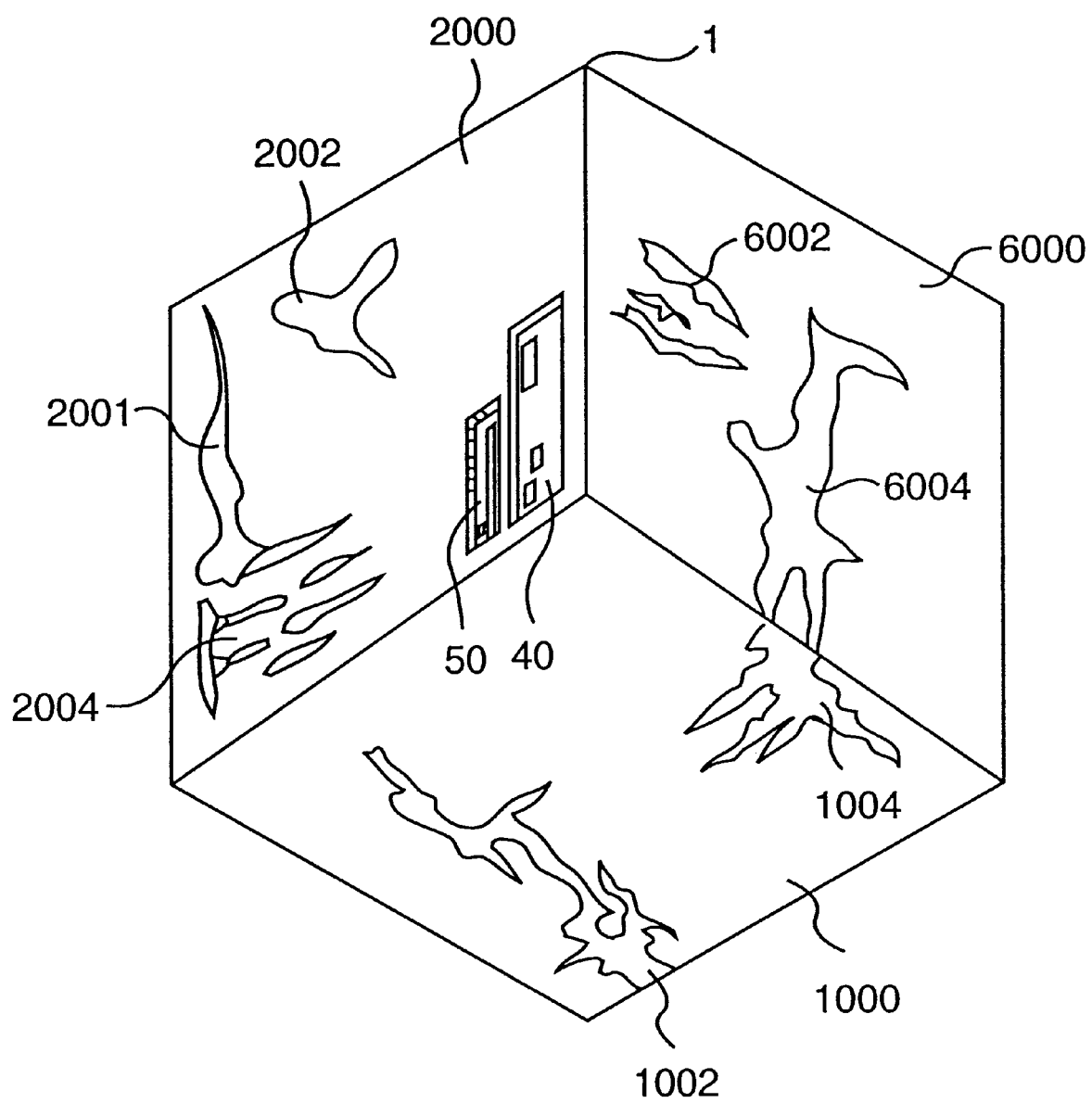
FIG. 13 is a perspective view showing panels of the cubular housing of the computer system of the instant invention.

FIG. 13 is a perspective view showing panels 1000, 2000 and 6000 of the cubular housing of the computer system of the instant invention. Panel 1000 includes surface graphic designs 1002 and 1004 to provide aesthetic qualities to the outside of the housing 1.

The arrangement of the internal components within the six-sided housing 1 as described by the foregoing allows for optimized cooling of the internal components of the computer system architecture. The optimized cooling results from the minimization of distances between each internal component and a respective side of the housing, combined with the provided ventilation system of air vents and fan placement, thus achieving maximized cooling of the system in a way not possible in the related art embodiments that place all internal components on a flat motherboard. Moreover, the sides of the housing 1 are preferably made with a material, such as anodized aluminum, with good thermal conduction to dissipate heat out of the interior of the housing. This enhanced cooling system results in increased efficiency in the performance of the internal components.

It will be apparent to those skilled in the art that various modifications and variations can be made in the computer system of the present invention without departing from the spirit or scope of the invention. Thus, it is intended that the present invention cover the modifications and variations of this invention provided they come within the scope of the appended claims and their equivalents.

What is claimed is:

1. A computer system comprising:

a bus system;

a pluggable central processing unit circuit board, coupled to the bus system;

a pluggable logic board coupled to the pluggable central processing unit circuit board through the bus system;

a pluggable input/output board coupled to the pluggable logic board through the bus system;

a first connector unit for directly connecting the pluggable central processing unit circuit board to a first predetermined location on the pluggable logic board without the use of a separate backplane between the pluggable central processing unit circuit board and the pluggable logic board; and a second connector unit for directly connecting the pluggable logic board to a predetermined location on the pluggable input/output board without the use of a separate backplane between the pluggable logic board and the pluggable input/output board.

2. The computer system according to claim 1, wherein the first connector unit includes a first mating portion and a second mating portion, wherein the first mating portion is mounted to a predetermined location on the pluggable central processing unit circuit board and the second mating portion is mounted to the first predetermined location on the pluggable logic board.

3. The computer system according to claim 1, wherein the second connector unit includes a first mating portion and a second mating portion, wherein the first mating portion is mounted to a second predetermined location on the pluggable logic board and the second mating portion is mounted to the predetermined location on the pluggable input/output board.

4. The computer system according to claim 1, wherein the first connector unit comprises at least 100 contacts per linear inch.

5. The computer system according to claim 1, wherein the second connector unit comprises at least 100 contacts per linear inch.

6. The computer system according to claim 1, wherein the pluggable logic board includes both serial and parallel ports.

7. The computer system according to claim 1, wherein said pluggable central processing unit circuit board includes a cache memory unit housed in at least one multi-chip module package.

8. The computer system according to claim 7, wherein each multi-chip module package comprises:

a housing including a plurality of insulative side walls and an end plate, said end plate joined to the side walls to define a cavity;

a plurality of electrically conductive leads held in said side walls, each of said conductive leads including an internal lead section extending within the cavity and an external lead section extending outside of said housing;

a plurality of integrated circuit memory dies mounted to said end plate within the cavity;

a plurality of interconnect dies mounted to said end plate within the cavity, each said interconnect die positioned adjacent to at least two of said plurality of integrated circuit dies; and electrically conductive material electrically connecting said electrically conductive leads, said integrated circuit dies, and said interconnect dies.

9. The computer system according to claim 1, wherein said computer system is housed within an approximately 10"×10"×10" cube.

10. The computer system according to claim 1, wherein said computer system is housed within a substantially cubed shape.

11. The computer system according to claim 1, wherein the pluggable central processing unit circuit board includes a central processor operating at a speed of 500 MHz or higher.

12. The computer system according to claim 1, wherein said pluggable central processing unit circuit board includes a cache memory of 4 megabyte or higher capacity.

13. The computer system according to claim 2, wherein the second mating portion of the first connector unit is situated on a central area of said pluggable logic board substantially parallel to a plurality of memory slots also situated on the pluggable logic board.

14. The computer system according to claim 3, wherein the first mating portion of the second connector unit is situated along an edge of the pluggable logic board substantially parallel to a plurality of memory slots also situated on the pluggable logic board.

15. The computer system according to claim 14, wherein the second mating portion of the second connector unit is situated along an edge of the pluggable input/output board substantially parallel to a plurality of PCI slots and to a plurality of ISA slots also situated on the pluggable input/output board.

16. The computer system according to claim 9, wherein a first panel of said cube includes an air intake opening for cooling a power supply unit.

17. The computer system according to claim 16, wherein a second panel of said cube includes an air intake opening for cooling a hard disk drive unit.

18. The computer system according to claim 17, wherein a third panel of said cube includes an air intake opening for cooling a processor and internal memory.

19. A computer system comprising:

a bus system;

a pluggable central processing unit circuit board, coupled to the bus system, including:
  a processor;
  a cache memory portion;
  a cache memory controller; and
  a voltage regulator module;

a pluggable logic board coupled to the pluggable central processing unit circuit board through the bus system, including:
  a plurality of controller devices;
  a plurality of memory slots;
  a plurality of peripheral device ports for coupling peripheral devices to the pluggable logic board;
  ISA bridge circuitry;

a pluggable input/output board coupled to the pluggable logic board through the bus system, including:
  a plurality of PCI slots;
  a plurality of ISA slots; and
  PCI—PCI bridge circuitry;

a first connector unit for directly connecting the pluggable central processing unit circuit board to a first predetermined location on the pluggable logic board without the use of a separate backplane between the pluggable central processing unit circuit board and the pluggable logic board; and a second connector unit for directly connecting the pluggable logic board to a predetermined location on the pluggable input/output board without the use of a separate backplane between the pluggable logic board and the pluggable input/output board.

20. The computer system according to claim 19, wherein the first connector unit includes a first mating portion and a second mating portion, wherein the first mating portion is mounted to a predetermined location on the pluggable central processing unit circuit board and the second mating portion is mounted to the first predetermined location on the pluggable logic board.

21. The computer system according to claim 19, wherein the second connector unit includes a first mating portion and a second mating portion, wherein the first mating portion is mounted to a second predetermined location on the pluggable logic board and the second mating portion is mounted to the predetermined location on the pluggable input/output board.

22. The computer system according to claim 19, wherein the first connector unit comprises at least 100 contacts per linear inch.

23. The computer system according to claim 19, wherein the second connector unit comprises at least 100 contacts per linear inch.

24. The computer system according to claim 19, wherein the pluggable logic board includes both serial and parallel ports.

25. The computer system according to claim 19, wherein said cache memory portion in the pluggable central processing unit circuit board is housed in at least one multi-chip module package.

26. The computer system according to claim 25, wherein each multi-chip module package comprises:
- a housing including a plurality of insulative side walls and an end plate, said end plate joined to the side walls to define a cavity;
- a plurality of electrically conductive leads held in said side walls, each of said conductive leads including an internal lead section extending within the cavity and an external lead section extending outside of said housing;
- a plurality of integrated circuit memory dies mounted to said end plate within the cavity;
- a plurality of interconnect dies mounted to said end plate within the cavity, each said interconnect die positioned adjacent to at least two of said plurality of integrated circuit dies; and
- electrically conductive material electrically connecting said electrically conductive leads, said integrated circuit dies, and said interconnect dies.

27. The computer system according to claim 19, wherein said computer system is housed within an approximately 10"×10"×10" cube.

28. The computer system according to claim 19, wherein said computer system is housed within a substantially cubed shape.

29. The computer system according to claim 19, wherein said processor is a 500 MHz or higher processor.

30. The computer system according to claim 19, wherein said cache memory is a 4 megabyte or higher cache memory.

31. The computer system according to claim 19, wherein said cache memory controller is a TAG controller.

32. The computer system according to claim 20, wherein the second mating portion of the first connector unit is situated on a central area of said pluggable logic board substantially parallel to the plurality of memory slots.

33. The computer system according to claim 21, wherein the first mating portion of the second connector unit is situated along an edge of the pluggable logic board substantially parallel to the plurality of memory slots.

34. The computer system according to claim 33, wherein the second mating portion of the second connector unit is situated along an edge of the pluggable input/output board substantially parallel to the plurality of PCI slots and to the plurality of ISA slots.

35. The computer system according to claim 27, wherein a first panel of said cube includes an air intake opening for cooling a power supply unit.

36. The computer system according to claim 35, wherein a second panel of said cube includes an air intake opening for cooling a hard disk drive unit.

37. The computer system according to claim 36, wherein a third panel of said cube includes an air intake opening for cooling the processor and internal memory.

* * * * *